United States Patent [19]

Menke

[11] Patent Number: 4,907,679

[45] Date of Patent: Mar. 13, 1990

[54] CATCH DEVICE FOR A ROLL-UP DOOR, GRATE, GRILL OR THE LIKE

[76] Inventor: Wilhelm Menke, Annettestrasse 6, 4425 Billerbeck, Fed. Rep. of Germany

[21] Appl. No.: 295,412

[22] Filed: Jan. 10, 1989

[51] Int. Cl.[4] .................................................. B60T 7/12

[52] U.S. Cl. .................................... 188/189; 188/82.8

[58] Field of Search .................... 188/82.8, 82.84, 136, 188/180, 181 A, 184, 185, 186, 189

[56] References Cited

U.S. PATENT DOCUMENTS 3,016,113 1/1962 Easley ............................ 188/136 X 4,015,696 4/1977 Lichti ................................ 188/189

*Primary Examiner*—Duane A. Reger

*Attorney, Agent, or Firm*—Herbert Dubno

[57] ABSTRACT

A catch device to prevent a rapid rotation of the shaft of a roll-up door or the like has a toothed brake wheel received in an asymmetric clamping ring in a housing. A pawl on the clamping ring engages in a toothed recess of the brake ring at excessive speeds of the wheel to entrain the clamping ring and wedge the latter against the housing.

15 Claims, 3 Drawing Sheets

CATCH DEVICE FOR A ROLL-UP DOOR, GRATE, GRILL OR THE LIKE

FIELD OF THE INVENTION

My present invention relates to a catch device for a roll-up door, grate, grill or like shutter system of the type in which the ascent and descent of the rolled structure is controlled by a shaft, the device serving to brake undesired or excessively rapid descent.

BACKGROUND OF THE INVENTION

Catch devices have been provided heretofore to protect roll-up doors, roll-up grates, roll-up grills and roll-up gates forming closures for protected areas, against undesired unrolling. Such devices have generally comprised a brake wheel which can be fixed to the windup shaft and which is provided with a brake body on the brake wheel engageable with a stationary housing.

Such catch devices prevent the uncontrolled unrolling of the door, grate, grill and gate by braking such movement. The shaft can have a worm wheel provided for this purpose.

In one prior system as described, for example, in German patent document DE-GM 82 25 405, the brake element is constituted as a ball detent which is dependent upon centrifugal force for its functioning and can be structurally independent of the worm drive.

In practice, the worm drive or transmission which winds up the door or the like is provided at one end of the shaft while the catch device is provided at the other end of this shaft. The arrangement of the catch device as a ball detent system independently of the worm transmission and as a separate unit is comparatively expensive.

Basically this drawback also characterizes the safety device for roll-up doors described in German Pat. No. 24 41 522.

In this case, the brake wheel is provided with spaces in which balls are arranged and upon an excessive acceleration of the wind-up shaft, the balls are pressed against the edge of the transmission housing.

The housing is provided with an appropriate recess for this purpose into which a ball is pressed so that the ball is clamped, based upon the dimensions of the recess and the ball into a gap which becomes progressively smaller between the housing and the wheel to block rotation of the shaft.

Apart from the fact that this latter catch device is relatively expensive and the machining of the parts for it must be carried out with low tolerances to ensure that the ball will jam properly in the gap, it is a disadvantage that the braking action takes place with point contact between the ball and the structures engaged thereby. To prevent destruction of the ball and thus a loss of braking effect with time, the pawl must be composed of a correspondingly hard and wear-resistant material.

OBJECTIONS OF THE INVENTION

It is, therefore, the principal object of the present invention to provide an improved catch device for the purposes described which is a simpler and less expensive construction than the devices described heretofore and which can operate more reliably for longer periods of time, suffering materially less wear.

Another object of this invention is to provide an improved catch device or roll-up door assembly including such a catch device, in which the braking surfaces contact each other over proportionally large areas to minimize wear and stress.

SUMMARY OF THE INVENTION

These objects and others which will become apparent hereinafter are attained, in accordance with the present invention by providing the brake wheel so that it possesses sawtooth formations around its periphery and corresponding recesses between the teeth, while the brake body is provided as an asymmetric clamping ring closely surrounding the brake wheel but normally allowing rotation thereof relative to the clamping ring.

On the clamping ring a swingable pawl is provided and is oriented so that at an excessive speed of the brake wheel and shaft, the pawl will jump into one of the recesses and lock the shaft against rotation. The pawl may be positioned so that with normal speed rotation of the brake wheel and shaft, the pawl is held out of engagement with these recesses.

A catch device of this type and in accordance with the invention is totally free from stress and is inactive during normal operations of the roll-up door or the like because the pawl is held by the brake wheel in a position which prevents angular coupling of the clamping ring to the brake wheel.

Only when the brake wheel rotates at an excessive speed, will the pawl be thrown into engagement in one of the recesses whereby the clamping ring is entrained with the brake ring angularly and because of its asymmetric shape will engage a surface of the housing to distribute the braking forces for relatively large areas of both the housing and the clamping ring.

The clamping ring is thereby brought into a clamping position which ensures a reliable capture and braking of the brake wheel.

Because of the surface contact between the clamping ring and the housing wall, where the two come into frictional engagement, there is a very rapid and uniform braking of the brake wheel.

The brake wheel here thus fulfills the function of a trigger wheel while the clamping ring takes over the function of the brake body.

To be certain that the pawl will engage in the respective recess of the brake wheel at the right moment, according to a feature of the invention, the pawl is dimensioned with respect to the spacing between the recesses to flip into one of the recesses when one end of the pawl is cammed by a tooth on the wheel at excessive speed.

At normal speeds, a rocking action of the pawl is caught by the next tooth in the sequence so that the pawl will not engage in any recess during normal operation. However, at excessive speeds of the brake wheel, the pawl will flip into engagement with a brake wheel recess where the continued rotation of the brake wheel will retain the pawl in the recess to ensure that the clamping ring will be entrained and because of its asymmetric configuration will clamp against the housing. As a consequence, high braking forces can be generated and the braking action can resist high forces.

A rapid wedging of the clamping ring against the housing can be ensured if the pawl is pivotally mounted in the clamping ring, especially in the thickest portion thereof. The thickest portion of the clamping ring should be located at the bottom when the clamping ring is disposed in a vertical plane. Because the center of gravity tends to swing the thickest portion into the bottom position, this position is assumed automatically by the thicker portion of the clamping ring and facilitates mounting of the pawl in the thickest portion which can also be the part which engages the housing to brake further rotation of the clamping ring and the brake ring when the pawl is engaged with a tooth of the brake wheel.

An upward flipping action of the tip of the pawl can be ensured by making the pawl arcuate and pivoting it so that its tip is on the longer arm of the pawl. The shorter arm can be provided with a roller where it is engageable with the teeth of the brake ring to reduce wear on the pawl and on the teeth. The center of gravity of the pawl thus holds the wheel against the teeth of the brake ring or wheel and tends to draw the tip of the pawl away from engagement with the brake wheel at normal operating speeds. A pin can be provided to position the clamping ring angularly, although it should be understood that any forces resisting rotation of the clamping ring and applied by the pin can be readily overcome should the pawl engage in a tooth of the brake wheel.

According to a feature of the invention, the housing which is engaged by the clamping ring is the transmission housing, i.e. the housing for the worm wheel and worm driving the roll-up door shaft. The catch device can then be integrated with the transmission which can be constituted as a plug-on transmission being simply fitted onto one end of the shaft by a plug-and-socket joint.

If the transmission is located above or below the windup shaft and connected with the latter via a chain, the housing for the catch device can be separate from the transmission and mounted directly upon the windup shaft itself so that, upon breakage of the chain or like support element, the braking effect will be initiated substantially immediately.

In effect, the pawl is held in a floating position by the brake wheel when it rotates at normal speed, especially when the teeth are uniformly equispaced around the periphery of the brake wheel and the pawl is so dimensioned that it spans over three of the saw teeth. At normal or slow rotary speeds of the windup shaft, therefore, the pawl will be raised at its engagement tip by the passage of each tooth without the danger that it will be propelled into the recess and locked there by the rotating brake wheel. However, at excessive speeds, the tip of the pawl will be flipped into the recess and engaged therein to swing the clamping ring with the brake wheel into the braking position. Because the failure of the drive chain or support element upon rupture may result in an excessive loading of the brake, I provide the inner surface of the clamping ring in the region of the pawl and in the region of entrainment of the clamping ring so that it is roughened or irregular whereby the teeth of the brake wheel following the tooth engaged with the pawl can bear upon the roughened surfaces, relieve the loading on the pawl-engaging tooth to reduce the danger of tooth or pawl breakage, and ensure rapid and reliable wedging of the clamping ring against the housing.

The required asymmetry of the clamping ring is achieved by shifting the center of the circular inner periphery slightly, preferably by about 5 mm, below the center of the circular outer periphery. In this manner a uniform optimum wedging effect is provided in the gap with the housing for very rapid braking of the brake wheel.

It is an important advantage of the invention that with the system as described, upon a break in the belt or chain constituting the supporting element for the shaft, the braking action will be initiated very rapidly because the pawl can engage practically instantaneously in one toothed recess and thereby entrain the clamping ring, in the event of a failure of the roll-up system, so that a wedging between the clamping ring and the brake wheel and between the clamping ring and the housing can result. In normal operation, by contrast, the undesired braking of the brake wheel and of the roll-up shaft is prevented because the configuration of the pawl prevents it from being engaged in one of the recesses of the toothed periphery of the brake wheel.

With slow rotation of the brake wheel, a tripping of the pawl into engagement with a toothed recess is precluded because the slowly moving teeth successively contact the roller on the end of the pawl to swing the tip upwardly while gravity acts to bring the tip downwardly when each tooth passes out of engagement with the roller.

When the brake wheel rotates rapidly however, the action of the tooth on the roller imparts greater momentum to the free end of the pawl so that it is flung upwardly into the path of the next tooth and is engaged firmly in the preceding recess. A rapid braking thus results.

An important advantage, of course, is that the actual braking effect takes place between juxtaposed surfaces and the part formed with these surfaces can be constituted by zinc die casting or from brass so that special machining is not required of the brake wheel or other parts of the catch system.

The configuration of the catch arrangement and the arrangement of the individual parts ensures rapid braking of the roll-up shaft with rupture of any entraining element, therefore, or other failure of the system.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
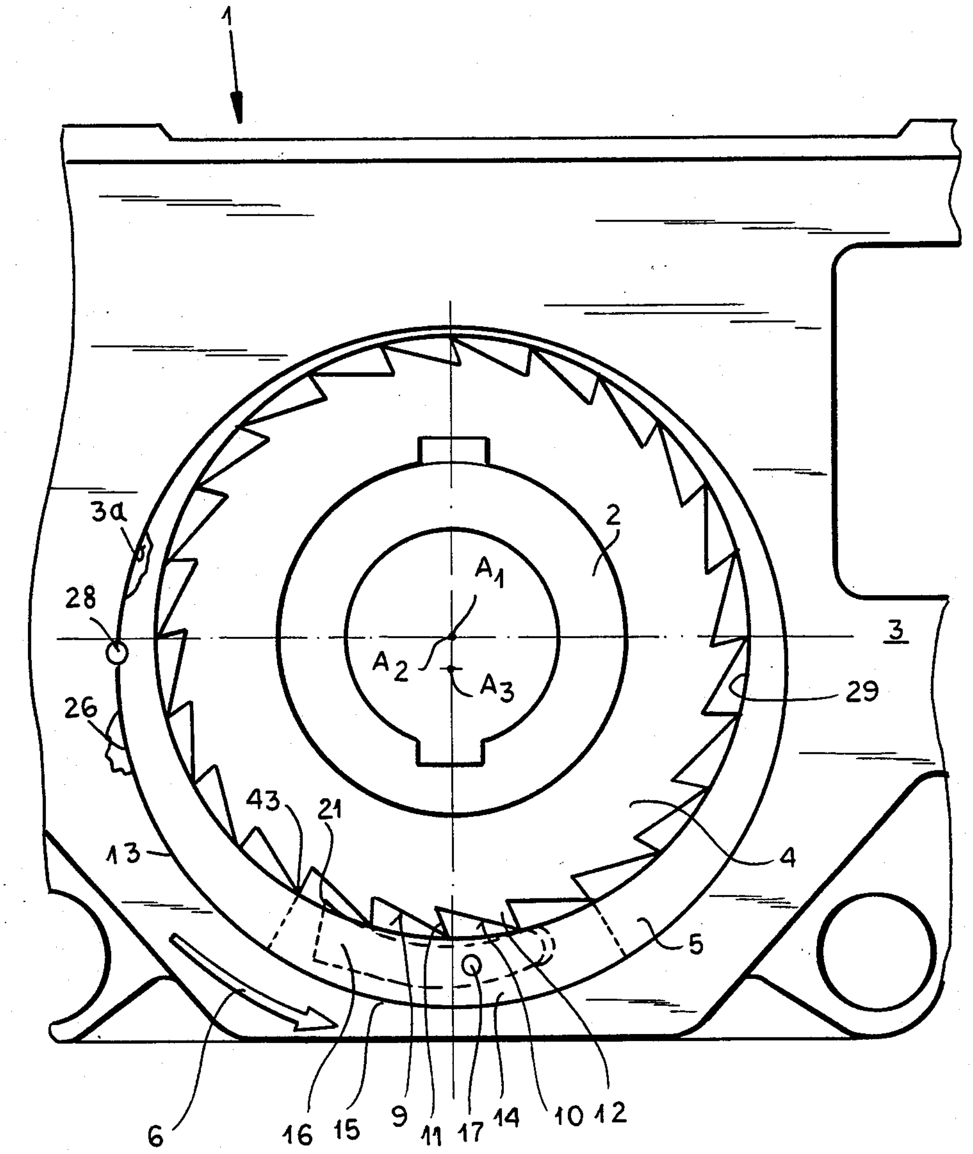
FIG. 1 is a side elevational view of a catch device in a normal position, i.e. without engagement of the pawl in a recess of the toothed periphery of the brake wheel.

The catch device illustrated in FIG. 1 and having the parts shown in the remaining Figures can be integrated into a plug-in type transmission which can be fitted on one end of a shaft or a roll-up door, gate, grate or the like.

Upon the roll-up shaft 2 which is rotatable in a housing 3 25 having a surface 3*a* with a center $A_2$, a brake wheel 4 is keyed so that the brake wheel and the shaft have a common axis of rotation $A_1$.

The periphery of the brake wheel 4 is provided with an array of uniformly spaced teeth of a sawtooth configuration. The direction of rotation of the brake wheel 4 when the roll-up door tends to fall is represented by the arrow 6.

The periphery of the brake wheel 4 is thus provided with uniformly spaced recesses 9 and 10 separating the saw teeth 11 and 12 from one another.

The clamping ring 13 is provided between the brake wheel 4 and the housing 3 and has an asymmetric configuration so that the inner periphery 29 of the clamping ring is circular and centered on the axis $A_1$ while the outer periphery 26 is likewise circular and centered on the axis $A_3$ some 5 mm below the axis $A_1$.

At the thickest (bottom) portion 14 of the clamping ring turned toward the bottom 15 of the housing 3, a pawl 16 is pivotally mounted at 17 on the clamping ring.

The pawl 16 has a longer arm 18 and a shorter arm 19, the center of gravity of the pawl being located on the longer arm between the free end or tip thereof and the pivot 17.

A roller 20 is rotatable on the free end of the shorter arm 19 and forms a cam-follower roller which is engaged in turn by each tooth 12 to prevent the longer arm 18 from dropping freely down.

The tip 21 of the longer arm 18, which has a configuration matching that of the recess 9 and 10 is thus held in the position shown in FIG. 1 until the tooth 12 passes, drops slightly downwardly until the next tooth 11 arrives to allow the tooth 43, for example, to clear the tip 21. Consequently, at low speeds of the brake wheel 4, the tip 21 will rise and lower without engagement of the pawl 16 in one of the recesses 9, 10.

However, upon rotation of the brake wheel 4 with excessive speed, the upward momentum of the arm 18 of the pawl resulting from a rapid contact of one of the teeth 11, 12 on the roller 20 will throw the tip 21 into one of the recesses 9, 10 and result in immediate entrainment of the clamping ring 13 in the direction of arrow 6. As a consequence, there is an immediate wedging of the clamping ring 13 between the brake wheel 4 and the housing, i.e. against the surface 3*a* which is centered at $A_3$. The brake wheel and the roll-up shaft 2 are thus brought to standstill at the shortest possible time so that the rupture of the carrier element or drive element can be repaired. The wheel 4 and ring 5 can be changed at the same time. The surface 3*a* may be provided on a replaceable ring (not shown) whose outer periphery has its center at $A_1$.

To retain the clamping ring 13 in the normal position shown in FIG. 1 for normal rotary speeds of the brake wheel 4, the pin 28 of the housing can engage in a notch 27 in the clamping ring.

Figure 4:
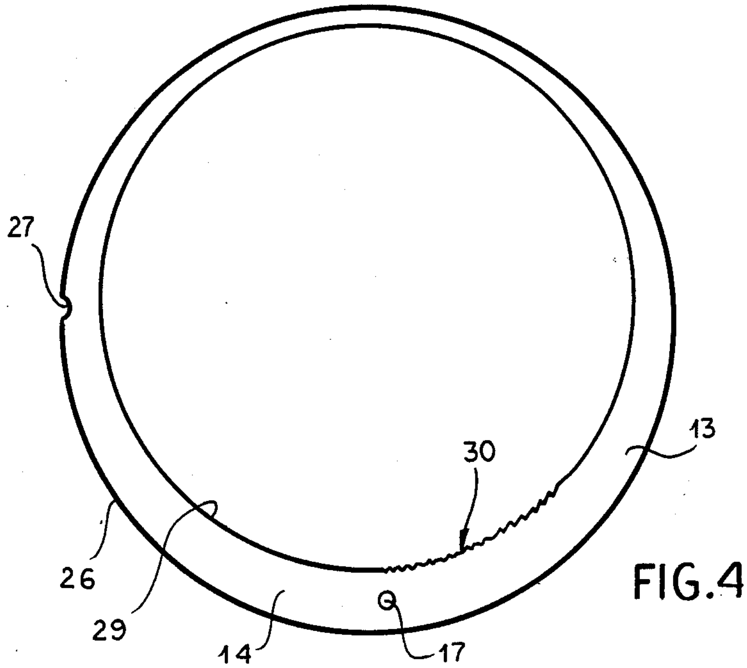
FIG. 4 is a side elevational view of the clamping ring.

FIG. 4 shows the asymmetric configuration of the clamping ring in greater detail and the fact that on the inner periphery 29, irregularities 30 can be formed which, during the wedging action allow teeth 11 and 12 of the brake wheel 4 to engage the inner periphery of the clamping ring. In the outer periphery 26, the notch 27 for the pin 28 can be seen in FIG. 4.

Figure 2:
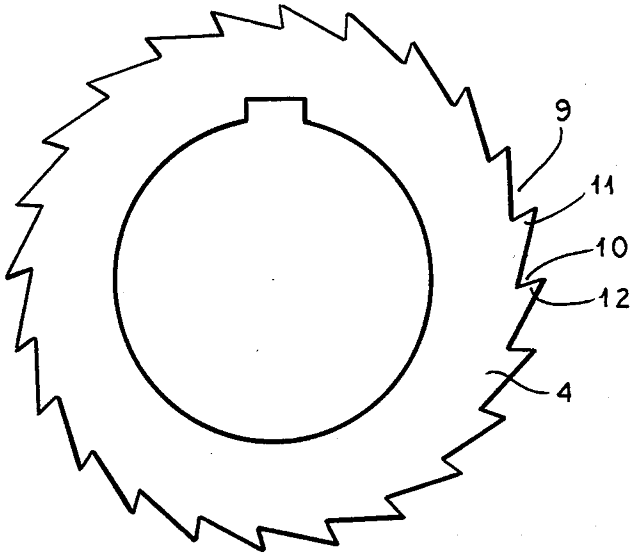
FIG. 2 is a side elevational view of the brake wheel.
Figure 3:
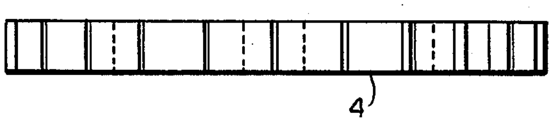
FIG. 3 is a plan view thereof.

FIGS. 2 and 3 show the brake wheel in greater detail and make clear that the saw teeth 11 and 12 and their recesses 9 and 10 are distributed uniformly over the periphery of the brake wheel.

Figure 5:
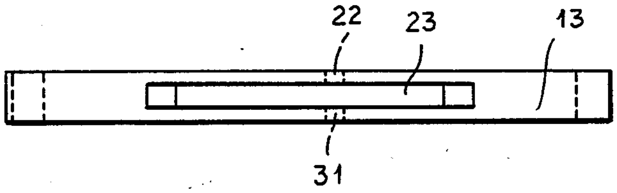
FIG. 5 is a plan view of the clamping ring.

FIG. 5 shows the clamping ring 13 in a plan view and illustrates that a cutout 23 is provided in the clamping ring in which the pawl 16 can be received. In the region of the cutout 23, bores 22 and 31 can be provided in the clamping ring to allow pins 24 and 25 of the pawl to be swingably received and thereby define the pivot point 17.

Figure 6A:
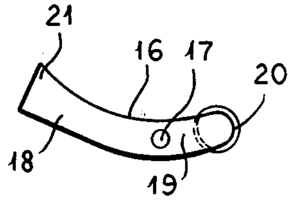
FIG. 6A is an elevational view of the pawl.
Figure 6B:
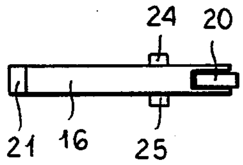
FIG. 6B is a top view of the pawl.

The arcuate configuration of the pawl 16 is clearly apparent from FIG. 6A and the relationship of the roller 20 to the pawl is apparent from both FIGS. 6A and 6B.

These Figures also show clearly that the braking action between the clamping ring and the housing is a surface action not confined to a single point.

I claim:

1. A catch device for a rotatable member, comprising:

a housing;

a shaft rotatable relative to said housing with said member;

a brake wheel mounted on said shaft in said housing and formed with a peripheral array of equispaced sawtooth formations regularly distributed around an outer circumference of said brake wheel;

a clamping ring surrounding said brake wheel and formed with a peripheral annular surface juxtaposed with a peripheral annular surface of said housing, at least one of said surfaces being eccentric with respect to an axis of rotation of said brake wheel and said shaft, whereby angular displacement of said clamping ring with said brake wheel brings said surfaces into clamping engagement, said brake wheel being rotatable in and relative to said clamping ring; and a swingably mounted pawl normally clearing said formations to permit rotation of said brake wheel relative to said clamping ring at normal rotary speeds of said brake wheel, and entrainingly engageable with one of said sawtooth formations of said brake wheel upon development of an excessive rotary speed of said brake wheel to angularly entrain said clamping ring with said brake wheel and bring said surfaces into clamping engagement to brake said brake wheel.

2. The catch device defined in claim 1 wherein said shaft is a shaft of a roll-up door or gate.

3. The catch device defined in claim 2 wherein said pawl is dimensioned and mounted in said clamping ring to be swung into a recess between two sawtooth formations by engagement with another of said formations at said excessive rotary speed.

4. The catch device defined in claim 2 wherein said clamping ring is of asymmetric configuration with a thickest portion juxtaposed with a bottom of the housing at said normal rotary speeds, said pawl being swingably mounted on said clamping ring at said thickest portion.

5. The catch device defined in claim 4 wherein said pawl is arcuate and has a center of gravity offset from a pivot point of said pawl so as to define longer and shorter arms of said pawl.

6. The catch device defined in claim 5 wherein said shorter arm is provided with a cam follower roller journaled thereon and reducing wear of said formations.

7. The catch device defined in claim 5 wherein said longer arm is provided with a tip shaped to conform to and engageable in a recess between two of said formations.

8. The catch device defined in claim 4 wherein said clamping ring is provided with a recess, said pawl being swingably mounted in said recess in said clamping ring.

9. The catch device defined in claim 4, further comprising a positioning pin on said housing releasably engaging said clamping ring for positioning same.

10. The catch device defined in claim 4 wherein said housing is a transmission housing for said roll-up door or gate.

11. The catch device defined in claim 4 wherein said pawl is dimensioned to extend over at least three of said formations.

12. The catch device defined in claim 4 wherein said clamping ring is provided with an irregular surface confronting said brake wheel and engageable therewith upon the clamping of said clamping ring between said brake wheel and said housing.

13. The catch device defined in claim 12 wherein said irregular surface is formed by roughening an inner surface of said ring.

14. The catch device defined in claim 4 wherein said clamping ring has circular inner and outer surfaces, the center of said circular inner surface being located slightly above the center of said circular inner surface.

15. The catch device defined in claim 14 wherein said center of said circular inner surface is located about 5 mm above the center of said circular outer surface.

* * * * *